United States Patent [19]

Majeed et al.

[11] Patent Number: 5,604,482

[45] Date of Patent: Feb. 18, 1997

[54] TIRE PRESSURE MONITOR

[75] Inventors: Kamal N. Majeed, Centerville; Mark R. De Poyster, Englewood, both of Ohio

[73] Assignee: General Motors Corporation, Detroit, Mich.

[21] Appl. No.: 441,570

[22] Filed: May 15, 1995

[51] Int. Cl.$^6$ .................................................. B60C 23/00
[52] U.S. Cl. ............................ 340/442; 340/443; 73/146
[58] Field of Search ................................. 340/444, 442, 340/443, 445, 447, 448; 73/146.2

[56] References Cited

U.S. PATENT DOCUMENTS

| | | | |
|---|---|---|---|
| 4,574,267 | 4/1986 | Jones | 340/58 |
| 4,876,528 | 10/1989 | Walker et al. | 340/442 |
| 5,218,862 | 6/1993 | Hurrell, II et al. | 73/146 |
| 5,248,957 | 9/1993 | Walker et al. | 340/444 |
| 5,497,657 | 3/1996 | Taguchi et al. | 340/448 |

FOREIGN PATENT DOCUMENTS

| | | | |
|---|---|---|---|
| 4330617A1 | 3/1995 | Germany | B60C 23/00 |
| 60-187837 | 9/1985 | Japan | B60C 23/06 |
| 91/14586 | 10/1991 | WIPO | B60C 23/00 |

Primary Examiner—Jeffery Hofsass
Assistant Examiner—Mohammed R. Ghannan
Attorney, Agent, or Firm—Anthony Luke Simon

[57] ABSTRACT

A tire pressure monitor apparatus comprising a vehicle body, four vehicle wheels including tires disposed at four corners of the vehicle body, four position sensors, one mounted between each wheel and the corresponding corner of the vehicle body and a microprocessor controller, wherein the microprocessor controller receives signals from the four relative position sensors and determines, responsive thereto, for each tire, a signal indicative of a pressure of air within the tire.

9 Claims, 4 Drawing Sheets

TIRE PRESSURE MONITOR

This invention relates to a tire pressure monitor.

BACKGROUND OF THE INVENTION

Vehicle tires typically require an internal air pressure to be maintained at a predetermined level for optimum performance of the tire during vehicle driving conditions. It is desirable for a driver to become alerted when tire pressure is low so that the vehicle operator can take corrective action, such as adding air to the tire or replacing a tire that continuously loses pressure. Known methods for detecting tire pressure include (i) placing a pressure transducer in or on the tire itself, (ii) measuring wheel rotational velocities and processing the rotational velocity information, and (iii) measuring, with acceleration sensors mounted on the wheel or a lower suspension member, vertical wheel accelerations and processing the acceleration information.

What is desired is a tire pressure monitor that does not require adding sensors to the vehicle wheel or wheel assembly and provides high resolution measurements of wheel tire pressure.

SUMMARY OF THE PRESENT INVENTION

It is an object of this invention to provide a tire pressure monitor in accordance with claim 1.

Advantageously, this invention provides a tire pressure monitor that does not need transducers mounted to the tire or mounted within the tire and does not require accelerometers mounted to a lower suspension member.

Advantageously, this invention provides a tire pressure monitor capable of determining relatively small changes in tire pressure.

Advantageously, this invention makes use of information already present on many motor vehicles to monitor tire pressure and provide information concerning the tire pressure to a vehicle operator.

In an example implementation of this invention, information provided by relative position or relative velocity sensors that measure relative vertical position or velocity between the vehicle wheel and the vehicle body are used to monitor the tire pressure. These relative position and relative velocity sensors are of a type commonly used on motor vehicles that include body level control systems, variable force damper systems and/or variable force spring control systems. Thus, sensors already present on many vehicles are used to provide information for the tire pressure monitor according to this invention.

In an example preferred implementation of this invention, a tire pressure monitor is accomplished according to the steps of: determining a relative vertical velocity between a wheel and a vehicle body, and determining, responsive to the relative velocity, a signal indicative of a pressure of a tire of the wheel. In an example implementation, the signal indicative of the tire pressure is compared to a predetermined threshold, wherein when the signal is below the predetermined threshold, low tire pressure is indicated.

Advantageously, in another example preferred implementation of this invention, a tire pressure monitor is provided according to the steps of: determining responsive to a sensor signal, a relative vertical velocity between a vehicle wheel and a vehicle body; band pass filtering the relative velocity signal to provide a band passed filtered signal including frequency components indicative of wheel movement; applying a zero crossing detector to the band pass filtered signal and determining a frequency of the zero crossings; providing the zero crossings frequency to a logic filter that passes the zero crossings frequency if the zero crossing frequency is in a predetermined frequency range; applying the zero crossing frequencies that pass through the logic filter to a moving average filter to determine a moving average of the zero crossing frequencies, wherein the moving average is a signal indicative of pressure in a tire of the wheel.

In yet another example preferred implementation of this invention, a tire pressure monitor apparatus is provided comprising a vehicle body, four vehicle wheels disposed at four corners of the vehicle body, four position sensors, one mounted between each wheel and the corresponding corner of the vehicle body and a microprocessor controller, wherein the microprocessor controller receives signals from the four relative position sensors and determines, responsive thereto, signals indicative of a pressure of air within each tire.

BRIEF DESCRIPTION OF THE DRAWINGS

The present invention will now be described by way of example with reference to the accompanying drawings in which.

DETAILED DESCRIPTION OF THE INVENTION

Figure 1:
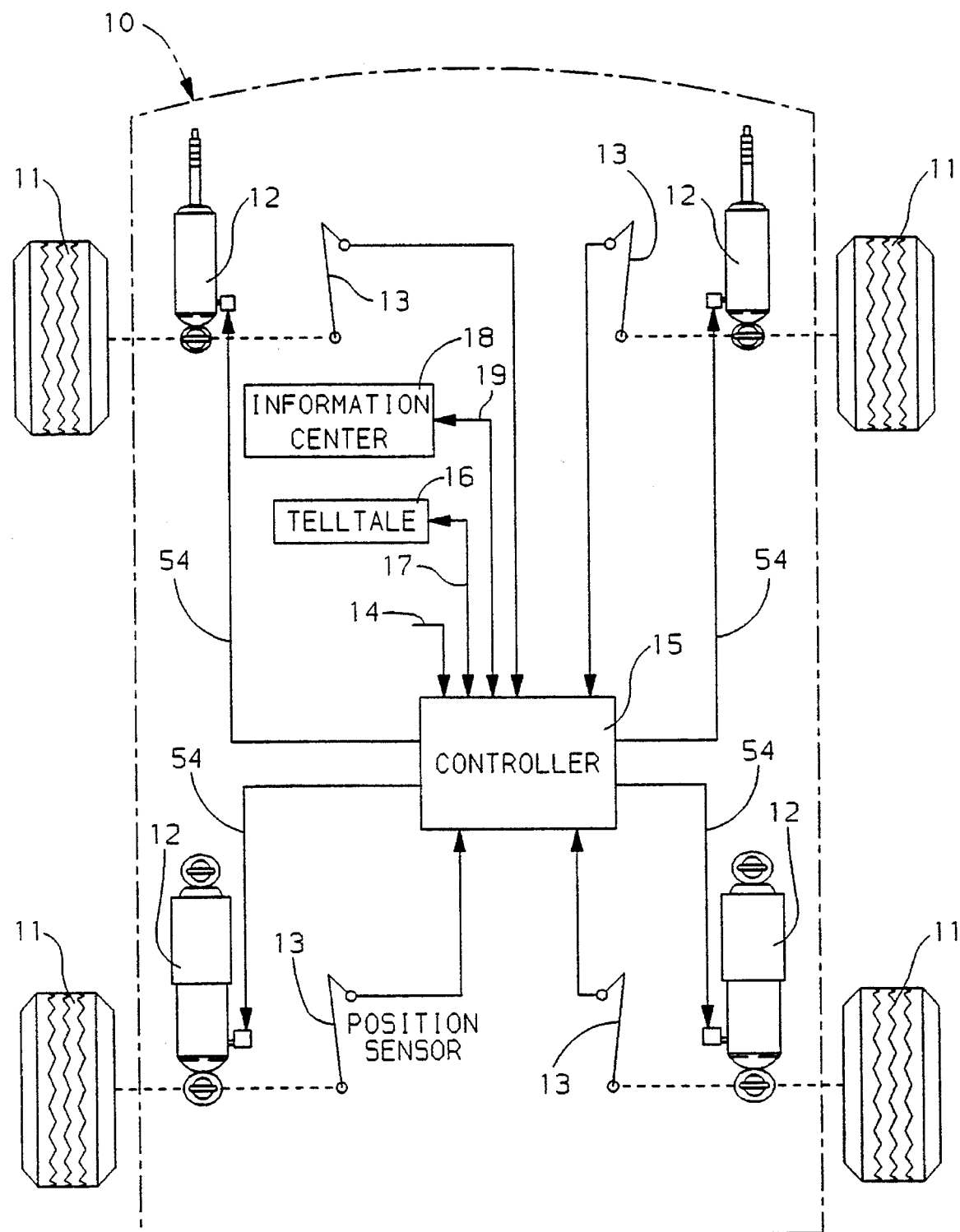
FIG. 1 illustrates schematically an example apparatus according to this invention.

Referring to FIG. 1, an example apparatus for implementation of this invention is shown and, in general, comprises a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Actuator 12 of this embodiment comprises an electrically controllable, variable force damper in parallel with a weight bearing coil spring in a parallel shock absorber/spring or McPherson strut arrangement. A description of a variable force damper suitable for use as actuator 12 is the continuously variable damper described in U.S. Pat. No. 5,282,645, assigned to the assignee of this invention.

Although the vehicle shown in FIG. 1 includes variable force actuators 12, this invention does not require such actuators and the variable force actuators 12 can be replaced with conventional shock absorbers and/or struts of a type that are not electronically controlled. Further, the vehicle may include combination damper/variable force springs of the type used in level control systems or may include any other type of suspension damper.

Each corner of the vehicle includes a linear position sensor 13 that provides an output signal indicative of the relative distance between the vehicle wheel and the suspended vehicle body at that corner of the vehicle. Suitable position sensors 13 can be easily constructed by those skilled in the art. The outputs of the position sensors 13 may be differentiated to produce relative body-wheel vertical velocity signals for each corner of the vehicle.

An example position sensor 13 includes a rotary resistive device mounted to the vehicle body and a link pivotably coupled between both the vehicle wheel and a pivot arm on the rotary resistive device such that the rotary resistive device provides an impedance output that varies with the relative position between the wheel 11 and the corner of the body 10. Each position sensor 13 may further include an internal circuit board with a buffer circuit for buffering the output signal of the rotary resistive device and providing the buffered signal to the controller 15. Suitable position sensors 13 can be easily constructed by those skilled in the art. Any alternative type of position sensor, including transformer type sensors, may be used as position sensor 13.

Position sensors 13 and/or corner relative velocity sensors are already present in many types of suspensions that include variable force actuators 12 or that include vehicle level control. An advantage provided by this invention is that many vehicles already have the required sensors, i.e., relative positions sensors 13, or alternatively, relative velocity sensors. Thus a tire pressure monitor according to this invention can be implemented without additional sensor hardware.

The outputs of relative position sensors 13 are provided to a controller 15, which processes the signals to determine the states of vehicle body 10 and wheels 11 and generates an output actuator control signal for each variable actuator 12. Other input signals to controller 15 can be provided through bus 14. Further, controller 15, responsive to the signals from relative position sensors 13, determines, according to this invention, signals indicative of the mount of air pressure in each tire 11. The controller 15 then outputs the tire pressure signals to a microprocessor controlled vehicle information center 18, which reports the tire pressures to the vehicle operator when commanded. Controller 15 also outputs a signal on line 17 to the telltale 16 to indicate to a vehicle operator that one or more of the vehicle tires is low.

Figure 2:
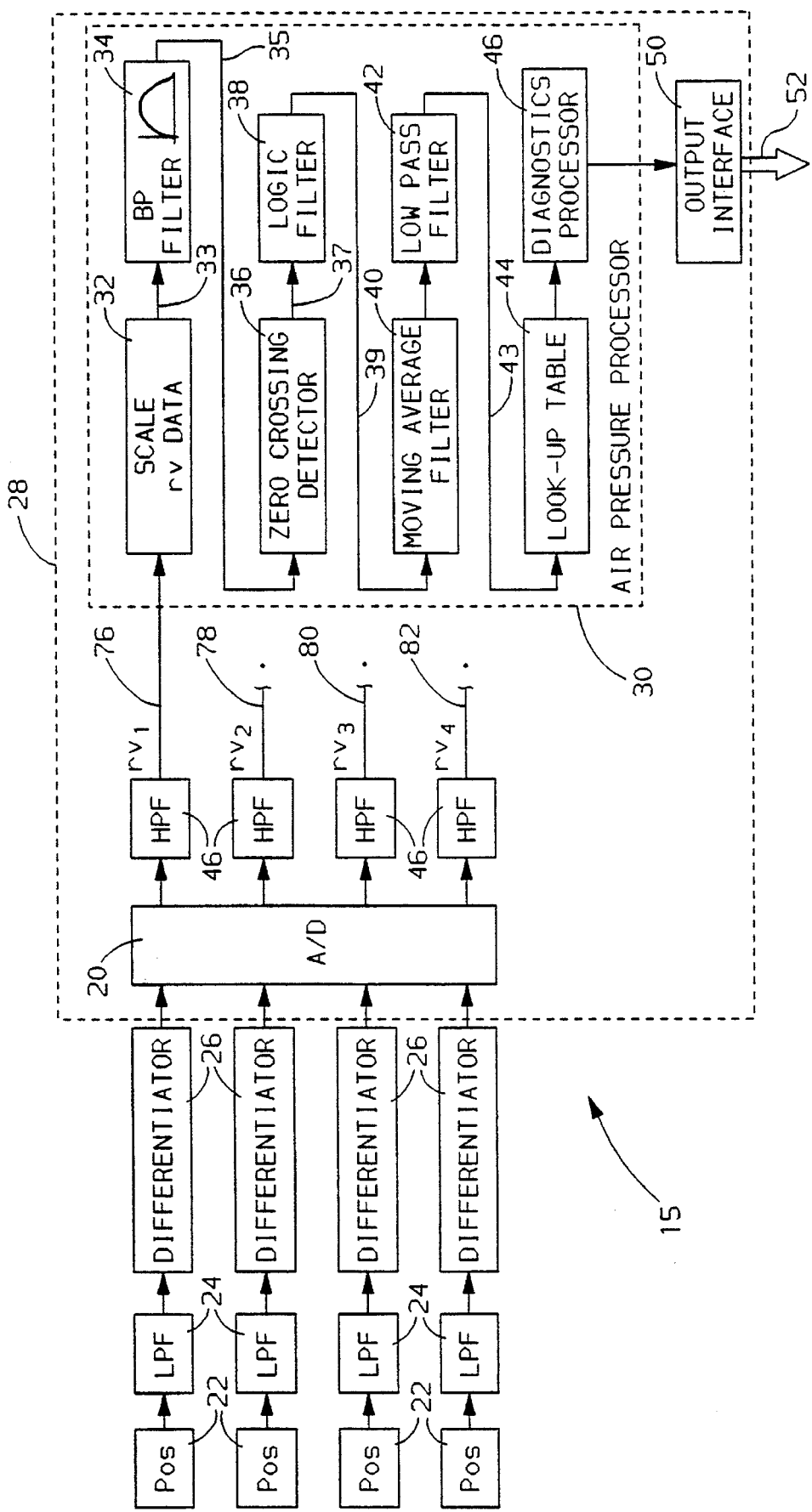
FIG. 2 illustrates schematically an example control structure according to this invention.

Controller 15 is shown in more detail in FIG. 2. Signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. No. 5,255,191, issued Oct. 19, 1993. The resulting relative velocity signals represent the relative velocity between the front left wheel and the front left corner of the body, $rv_1$, the rear left wheel and the rear left corner of the body, $rv_2$, the front right wheel and the front right corner of the body, $rv_3$, and the rear right wheel and the rear right corner of the body, $rv_4$. Each of these relative velocity signals is input to a digital microcomputer 28, which includes an input A/D converter 20 with multiplexed inputs; and each is digitally high-pass filtered within microcomputer 28 to remove any DC offset introduced by the digitation of A/D converter 28.

The microcomputer 28 may provide one or more chassis control functions, such as providing control signals to the variable force actuators 12 in FIG. 1, responsive to the relative velocity signals on lines 76, 78, 80 and 82 and may be used to provide control signals for other chassis systems.

In the improvements, according to this invention, the relative velocity signals on lines 76, 78, 80 and 82 are provided to a tire pressure monitor control processor 30 to process the relative velocity signals and perform the tire pressure monitor functions of this invention. While, in FIG. 2, only the signal on line 76 is shown input into processor 30, it is understood that each of the signals on lines 78, 80 and 82 are processed, according to this invention, in the same manner that the signal on line 76 is processed.

More particularly, the signal on line 76, $rv_1$, is first input into a scaling function block 32, which is optionally implemented if it is desired to scale the relative velocity signal on line 76 into standard or operator-defined units other than the units inherent in the signal on line 76.

After being scaled, the relative velocity signal is provided to the input of band pass filter 34, which band pass filters the scaled relative velocity signal on line 33. Only those portions of the relative velocity signal in a band associated with wheel movement frequencies pass through the band pass filter. While the frequency band of wheel movement will vary somewhat from vehicle to vehicle, an example band range for the frequencies passed and not attenuated by the band pass filter 34 is 8–18 Hz. To implement the band pass filter, a preferable example is an 8th-order Butterworth band pass filter calibrated to attenuate frequency signals outside the 8–18 Hz band.

The output of the band pass filter 34 on line 35 is provided to the zero crossing detector 36, which finds the zero crossings of the filtered signal on line 35 by comparing the sign of the present signal sample on line 35 to the sign of the previous signal sample. A counter is reset with each detected zero crossing or change in the sign of the samples and counts the number of samples since the previous sign change. The counter is then used by block 36 to calculate the frequency of the zero crossings. The frequency calculation can be implemented as:

$$f=(\text{sample frequency})/(2{}^{*}\text{COUNT}),$$

where "sample frequency" is the frequency that the relative velocity signals are sampled and COUNT is the value of the above mentioned counter.

The output of the zero crossing detector 36 on line 37 is the frequency of the zero crossings of the band pass filtered relative velocity signal on line 35. The zero crossing frequency signals on line 37 are then provided to logic filter 38, which compares the signals on line 37 to upper and lower thresholds and passes only the signals on line 37 that are less than the upper threshold and greater than the lower threshold. The upper and lower thresholds are set to correspond to the upper and lower band limits of band pass filter 34, for example, 8 and 18 Hz. Thus, in this example, frequencies provided on line 37 that are below 8 Hz and above 18 Hz are not allowed to pass through filter 38.

The output of filter 38 on line 39 is provided to the moving average filter 40, which, for example, can be implemented as a 200 point moving average filter to determine the moving average of the filtered zero crossing frequencies on line 39. The moving average filter may be implemented as:

$$\text{AVE}=(\text{sample frequency}){}^{*}(\text{CROSSINGS})/(2{}^{*}\text{TOTAL}),$$

where CROSSINGS is the number of zero crossings and TOTAL is the total number of samples. An example sample frequency is 1000 Hz and an example maximum number of zero crossings is 200.

The output of the moving average filter 40 is provided to low pass filter 42, which, in one example, is a 4th-order Butterworth IIR filter. In implementing the low pass filter 42, it should be taken into consideration that the output of filter 40 is not a truly time-based signal, but rather is based on frequency samples having varying intervals between the samples. However, to approximate a time based nature for the frequency samples, an average time between the frequency sample provided to filter 40 is determined as approximately twice the period of the approximate center frequency of the band limited relative velocity signal. The average time is then used in the filter as the sampling period. An example suitable average time is 0.037 seconds or corresponding to an average frequency of the zero crossings at 27 Hz.

The low pass filter 42 smoothes the output of the moving average filter to provide a signal that is indicative of the air pressure in the tire corresponding to the corner of the vehicle of the relative velocity signal being processed. The output of low pass filter 42 is provided to look-up table 44, which provides an air pressure output, in p.s.i. units, responsive to the input on line 43. The output of the look-up table 44 may also be responsive to tire temperature to more accurately provide a tire pressure reading. The accuracy of the determined tire pressure according to this invention, may, for example, be within 2–5 p.s.i., in which case the output of the look-up table 44 would be considered a range of tire pressures.

The output of the look-up table 44 is provided to a diagnostics processor algorithm 46 that processes the tire pressure monitor information in the manner desired for the particular vehicle implementation. In one example, the diagnostics processor 46 simply compares the output of look-up table 44 to a predetermined threshold low tire pressure value. If the output of look-up table 44 is below the low tire pressure value, diagnostics processor 46 provides an output signal to output interface 50, which outputs a control signal on bus 52 to activate tell-tale 16 or other type of alarm in the instrumentation panel or information center of the vehicle.

Alternatively, diagnostics processor 46 can attribute a range of pressures for each tire, for example 27–29 p.s.i., and provide that information to the output interface 50. Output interface 50 provides, via control bus 52, the pressure information to a vehicle information center, allowing the tire pressure information to be accessed by a vehicle driver. Further, for vehicles mounted with automatic tire inflation devices, diagnostics processor 46, when recognizing that a particular tire has a low tire pressure, can send a control signal to activate the tire inflation device.

Additionally, the diagnostics processor 46 can determine control signals for use by a brake or suspension controller to adjust suspension and/or brake performance in a desired manner responsive to the monitored tire pressures determined according to this invention.

Figure 3:
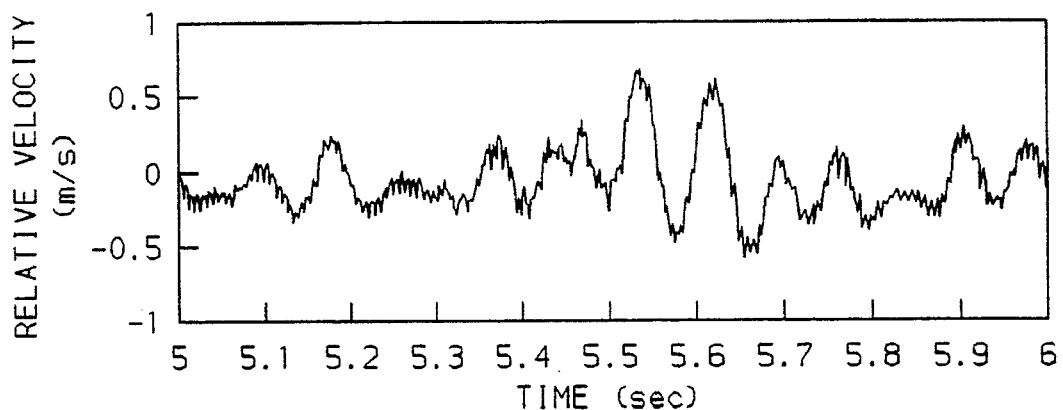
FIGS. 3, 4 and 5 illustrate example data demonstrating the operation of this invention.
Figure 4:
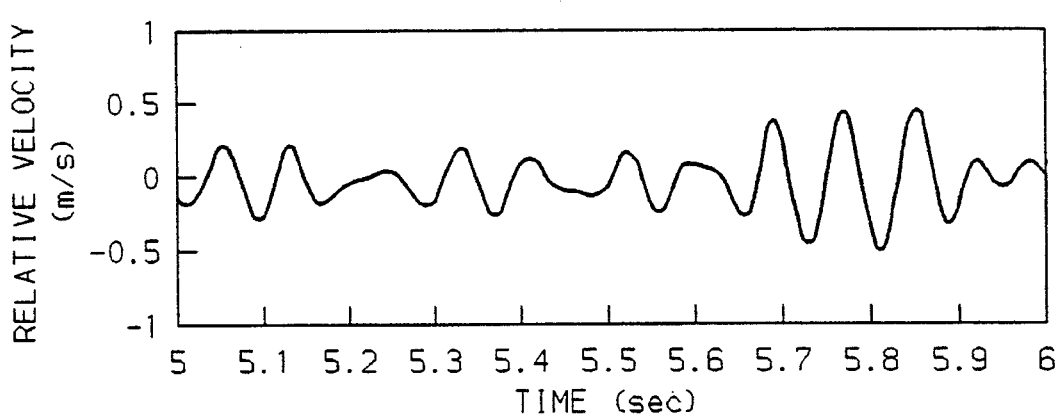
Figure 5:
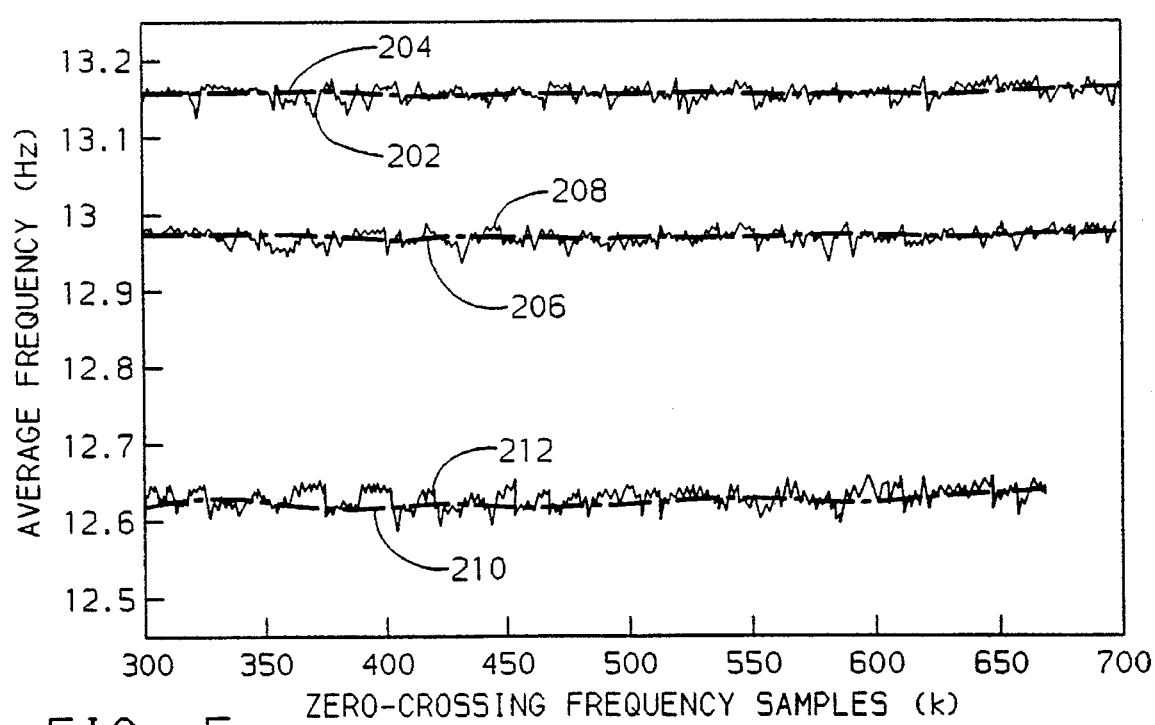

Referring to FIGS. 3, 4 and 5, the graphs show data illustrating the operation of this invention in a vehicle to provide signals indicative of tire pressure. The data illustrated is responsive to an input provided by a vehicle right front wheel relative position sensor as the vehicle is driven over a stretch of road at 40 m.p.h. FIG. 3 illustrates an example relative velocity signal measured from the right front wheel of the vehicle driven over the road. As can be seen by the peaks and valleys in the relative velocity signal, the stretch of road used causes suspension activity on the right front wheel.

FIG. 4 illustrates the results of the signal shown in FIG. 3, filtered through band pass filter 34 and is indicative of a signal provided on line 35 in FIG. 2.

FIG. 5 illustrates the outputs of the moving average filter 40 and low pass filter 42 and illustrates how this invention provides an indication of tire pressure. The same tire of the test vehicle was driven over the same stretch of road three times—once with an internal pressure of 29 p.s.i., once with an internal pressure of 24 p.s.i. and once with an internal pressure of 19 p.s.i. Traces 202, 208 and 212 of FIG. 5 illustrate the moving average filter output for the 29 p.s.i., 24 p.s.i. and 19 p.s.i. tires. In the output of the moving average filter, which is the average frequency of the zero crossings, clearly establishes the relation between the average frequency of the zero crossings and the amount of pressure in the vehicle tire.

Lines 204, 206 and 210 in FIG. 5 illustrate the output of low pass filters 42 for the different tire pressures. As can be seen, low pass filter 42 provides a much smoother signal than the output of the moving average filter. The different zero crossing average frequencies correlate to different tire pressures, allowing the average frequency, determined according to this invention, to be used as input to the look-up table 44 as an indication of tire pressure. Thus the tire pressure may be scheduled responsive to average frequency of the zero crossings.

Figure 6:
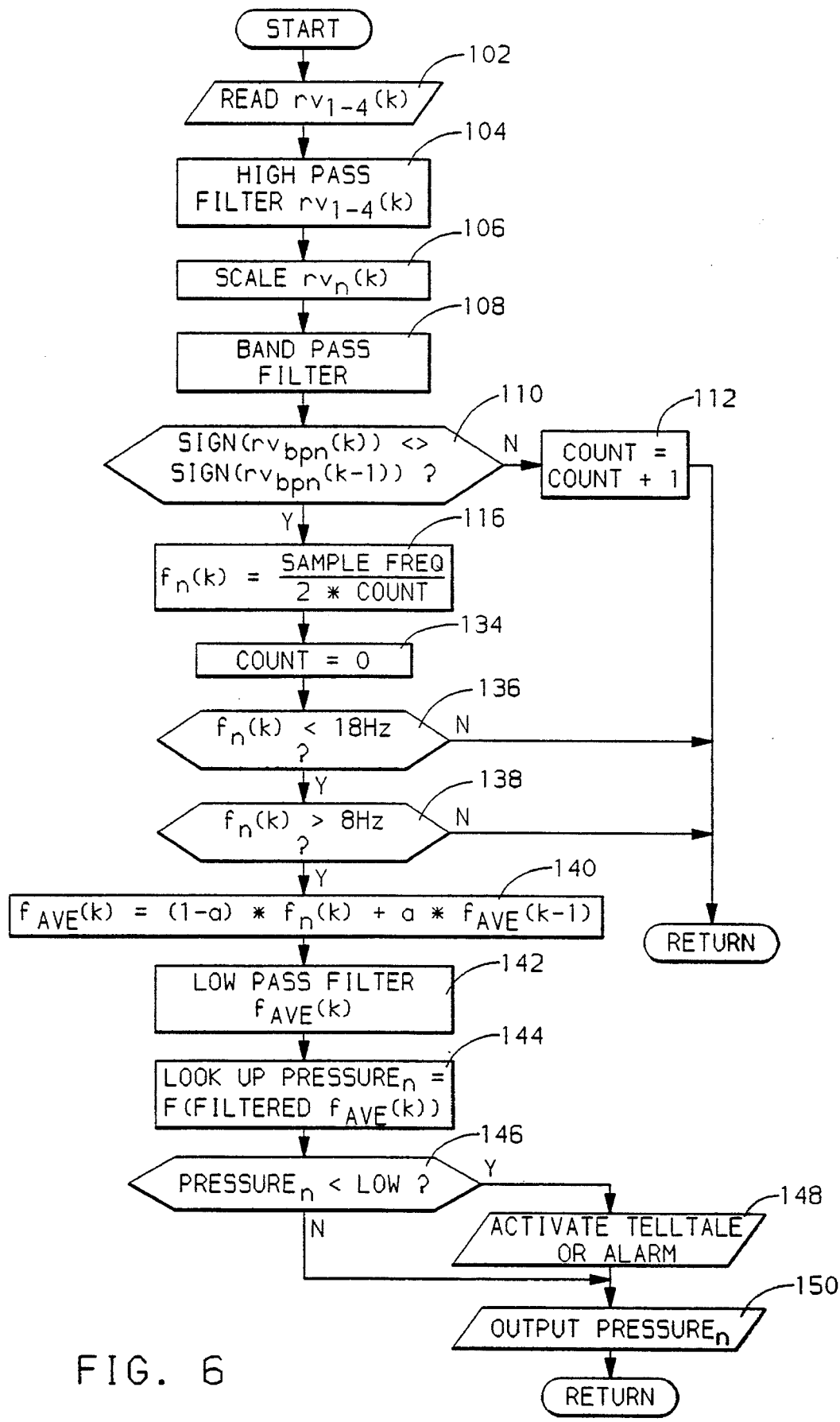
FIG. 6 illustrates a flow diagram of an example microprocessor control implementation according to this invention.

Referring now to FIG. 6, an example control routine for implementation of this invention into the microprocessor controller 15 is illustrated. The control routine may be implemented as an interrupt routine of a main control program that performs general microprocessor housekeeping functions and may provide other types of chassis control functions such as control of the variable force actuators 12 shown in FIG. 1. The interrupt routine first reads from the microprocessor A/D input the four relative velocity signals at block 102. At block 104, the routine implements a standard high pass filter to remove the DC bias from the relative velocity signals 1–4. At block 106 the relative velocity signals are scaled, if desired, to provide the signal in terms of standard or system designer-set units.

Block 108 discretely implements the band pass filter 34 shown in FIG. 2. An example discrete implementation of the band pass filter at block 108 is a fourth order Type II Chebychev filter as follows:

$$y(k) = a_0 y(k-1) - a_1 y(k-2) + a_2 y(k-3) - a_3 y(k-4) +$$
$$a_4 y(k-5) - a_5 y(k-6) + a_6 y(k-7) - a_7 y(k-8) + b_0 u(k) -$$
$$b_1 u(k-1) + b_2 u(k-2) - b_3 u(k-3) + b_4 u(k-4) -$$
$$b_5 u(k-5) + b_6 u(k-6) - b_7 u(k-7) + b_8 u(k-8),$$

where k denotes the present microprocessor control loop, k–n denotes the nth previous control loop, y(k) is the filter output, u(k) is the filter input and $a_{1-7}$ and $b_{1-8}$ are filter constants. Assuming a control loop period of 0.001 seconds, example filter constants are $a_0$=6.629, $a_1$=19.9655, $a_2$=35.5548, $a_3$=40.8819, $a_4$=31.0639, $a_5$=5.2405, $a_6$=4.4213, $a_7$=0.5829, $b_0$=0.0102, $b_1$=0.0629, $b_2$=0.1825, $b_3$=0.3254, $b_4$=0.3914, $b_5$=0.3254, $b_6$=0.1825, $b_7$=0.0629 and $b_8$=0.0102.

The routine then moves to block 110 where it compares the sign of the current band pass filtered relative velocity signal $rv_{bpn}(k)$ to the sign of the previous band passed filtered signal $rv_{bpn}(k-1)$ to detect zero crossings in the signal. Note: n=1, 2, 3 or 4 for the various corners of the vehicle; k denotes the current time period or control loop and k–1 denotes the signal determined in the previous control loop.

If the signs of the signals are not different at block 110, the routine moves to block 112 where a value COUNT is incremented and then returns out of the interrupt loop. If a zero crossing is detected by the two signals $rv_{bpn}(k)$ and $rv_{bpn}(k-1)$ at block 110 having different signs, the routine moves to block 116 where it determines the frequency of the zero crossings as:

$$f_n(k) = (\text{sample frequency})/(2 \cdot \text{COUNT}),$$

where "sample frequency" is the frequency that the relative velocity signals are sampled. The routine then moves to block 134 where the variable COUNT is reset to zero.

Blocks 136 and 138 implement the logic filter by simply comparing the frequency sample $f_n(k)$ to a value corresponding to 18 Hz at block 136 and a value corresponding to 8 Hz at block 138. If the frequency sample of the zero crossing $f_n(k)$ is not less than 18 Hz or greater than 8 Hz, then the interrupt routine is exited.

If the frequency sample of the zero crossings is within the proper range, then the routine moves to block 140 where the moving average filter is implemented to determine a value, $f_{AVE}(k)$, indicative of the average frequency of the zero crossings. The average frequency is determined as follows:

$$f_{AVE}(k) = (1-a)^* f_n(k) + a^* f_{AVE}(k-1),$$

where a is a filter constant having a value typically in the range between 0.95 and 0.9999.

As explained above, the average frequency of the zero crossings is indicative of the pressure of the tire of the wheel corresponding to the sensor providing the relative velocity signals. From block 140, the routine moves to block 142 where it low pass filters the signal $f_{AVE}(k)$ through a 2nd-order Butterworth low pass filter that is implemented discretely as:

$$y(k) = a_0 y(k-1) - a_1 y(k-2) + b_0 u(k) + b_1 u(k-1) + b_2 u(k-2),$$

where $y(k)$ is the filter output, $u(k)$ is the filter input and $a_0$, $a_1$, $b_0$, $b_1$ and $b_2$ are the filter constants. Example values for the filter constants are: $a_0=1.9999$, $a_1=0.9999$, $b_0=0.1558e^{-8}$, $b_1=0.3117e^{-8}$ and $b_2=0.1558e^{-8}$.

Block 144 performs a look-up table function to look up the tire pressure corresponding to the filtered average frequency signal. At block 146, if the pressure output from the look-up table is less than a threshold LOW, then block 148 activates a tell-tale alarm to indicate that the vehicle driver has a low tire pressure. At block 150, the tire pressure is output to the driver information center so that it may be accessed by the vehicle operator if desired.

It is understood that the above-described computer flow routine is implemented once for each corner of the vehicle so that the fill or internal pressures of each of the four tires can be monitored according to this invention.

It is also understood that, while described in terms of a four wheel vehicle, this invention may also be implemented on multi-axle commercial vehicles.

In another example implementation of the invention, average period of the relative velocity signal is used instead of the average frequency. This eliminates the necessity of performing a division operation in the microprocessor while providing equivalent information. In this example, the look-up table 44 (FIG. 2) and block 144 (FIG. 6), has an input of average period instead of average frequency. Also, block 116 (FIG. 6) is implemented as:

$$T_n(k) = 2^* \text{COUNT}/(\text{sample frequency}) \text{ or } T_n(k) = 2^* \text{COUNT}^* T_s,$$

where $T_s$ is the sample time or period and $T_n(k)$ is the period of the zero crossings. The remainder of the control routine operates similarly as described above, with the exception that blocks 136 and 138 are period comparisons and that block 140 determines the average period, which is $1/f_{AVE}(k)$.

I claim:

1. A tire pressure monitor method according to the steps of:

determining (22, 24, 26) a relative vertical velocity between a wheel and a vehicle body responsive to a sensor mounted between the wheel and the body;

band pass filtering (108) the relative velocity signal to provide a band passed filtered signal including frequency components indicative of wheel movement;

detecting each change in sign of the band pass filtered signal and determining (116) a frequency of the detected sign changes; and determining (30), responsive to the frequency of the detected sign changes, a signal indicative of a pressure of a tire of the wheel.

2. The tire pressure monitor method of claim 1, also comprising the step of comparing the frequency of the detected sign changes to upper and lower thresholds and passing the frequency of the detected sign changes if the frequency of the detected sign changes is within the upper and lower thresholds, wherein the frequencies passed are indicative of wheel movement, wherein the step of determining the signal indicative of the pressure of the tire of the wheel is responsive to the frequencies passed.

3. The tire pressure monitor method of claim 2, also comprising the step of applying the frequencies passed to a moving average filter (40, 140) to determine a moving average of the frequencies passed, wherein the moving average is the signal indicative of pressure of the tire of the wheel.

4. A tire pressure monitor method according to the steps of:

determining (102), responsive to a sensor mounted between a vehicle body and a vehicle wheel, a signal indicative of a relative vertical velocity between the vehicle wheel and the vehicle body;

band pass filtering (108) the relative vertical velocity signal to provide a band passed filtered signal including frequency components indicative of wheel movement;

detecting each change in sign of the band pass filtered signal;

determining (116) a frequency of the sign changes;

comparing the frequency of the detected sign changes to upper and lower thresholds and passing the frequency of the detected sign changes if the frequency of the detected sign changes is within the upper and lower thresholds, wherein the frequencies passed are indicative of wheel movement;

applying the frequencies passed to a moving average filter (40, 140) to determine a moving average of the frequencies passed, wherein the moving average is a signal indicative of pressure in a tire of the wheel.

5. A tire pressure monitor method according to the steps of:

determining (102), responsive to a sensor mounted between a vehicle body and a vehicle wheel, a signal indicative of a relative vertical velocity between the vehicle wheel and the vehicle body;

band pass filtering (108) the relative vertical velocity signal to provide a band passed filtered signal including frequency components indicative of wheel movement;

detecting each sign change of the band pass filtered signal;

determining (116) a period between the sign changes;

comparing the period of the detected sign changes to upper and lower thresholds and passing the period of the detected sign changes if the period of the detected sign changes is within the upper and lower thresholds, wherein the periods passed are indicative of wheel movement;

applying the periods passed to a moving average filter (40, 140) to determine a moving average of the periods passed, wherein the moving average is a signal indicative of pressure in a tire of the wheel.

6. A tire pressure monitor apparatus comprising:

a sensor circuit (22, 24, 26) providing a first signal indicative of a relative vertical velocity between a vehicle wheel and a vehicle body;

a first filter (34) receiving the relative velocity signal at its input and providing, responsive there to, a second signal including frequency components of the relative velocity signal indicative of wheel movement;

a zero crossing detector (36) having an input and an output, receiving at the zero crossing detector input the second signal and, responsive thereto, providing a third signal at the zero crossing detector output indicative of a frequency of sign changes of the second signal;

a second filter (38) having an input and an output, the second filter receiving the third signal at its input and providing, responsive thereto, a fourth signal containing portions of the third signal within a predetermined frequency range indicative of wheel movement; and a third filter (40) having an input and an output, the third filter receiving the fourth signal at its input and, responsive thereto, providing a fifth signal at its output, wherein the fifth signal is a moving average of the fourth signal and is indicative of pressure in a tire of the wheel.

7. A tire pressure monitor apparatus comprising:

a sensor circuit (22, 24, 26) providing a first signal indicative of a relative vertical velocity between a vehicle wheel and a vehicle body;

a first filter (34) receiving the relative velocity signal at its input and providing, responsive there to, a second signal including frequency components of the relative velocity signal indicative of wheel movement;

a zero crossing detector (36) having an input and an output, receiving at the zero crossing detector input the second signal and, responsive thereto, providing a third signal at the zero crossing detector output indicative of a period between sign changes of the second signal;

a second filter (38) having an input and an output, the second filter receiving the third signal at its input and providing, responsive thereto, a fourth signal containing portions of the third signal within a predetermined frequency range indicative of wheel movement; and a third filter (40) having an input and an output, the third filter receiving the fourth signal at its input and, responsive thereto, providing a fifth signal at its output, wherein the fifth signal is a moving average of the fourth signal and is indicative of pressure in a tire of the wheel.

8. A tire pressure monitor apparatus comprising:

a sensor circuit (22, 24, 26) providing a first signal indicative of a relative vertical velocity between a vehicle wheel and a vehicle body;

a zero crossing detector (36) having an input and an output, the zero crossing detector input coupled to the sensor circuit and providing a second signal at the zero crossing detector output indicative of a frequency of sign changes of the first signal;

a moving average filter (40) having an input and an output, the moving average filter input coupled to the output of the zero crossing detector, the moving average filter, responsive to the second signal, providing a third signal at its output, wherein the third signal is a moving average of the second signal and is indicative of pressure in a tire of the wheel.

9. A tire pressure monitor apparatus comprising:

a sensor circuit (22, 24, 26) providing a first signal indicative of a relative vertical velocity between a vehicle wheel and a vehicle body;

a zero crossing detector (36) having an input and an output, the zero crossing detector input coupled to the sensor circuit and providing a second signal at the zero crossing detector output indicative of a period between sign changes of the first signal;

a moving average filter (40) having an input and an output, the moving average filter input coupled to the output of the zero crossing detector, the moving average filter, responsive to the second signal, providing a third signal at its output, wherein the third signal is a moving average of the second signal and is indicative of pressure in a tire of the wheel.

* * * * *